United States Patent [19]

Smith

[11] Patent Number: 4,856,810
[45] Date of Patent: Aug. 15, 1989

[54] SELF-ACTUATING COLLAPSIBLE TRANSPORT CART

[76] Inventor: Gordon N. Smith, 821 W. Clarion Dr., Torrance, Calif. 90502

[21] Appl. No.: 132,149

[22] Filed: Dec. 14, 1987

[51] Int. Cl.$^4$ ................................................. B62B 3/00
[52] U.S. Cl. ....................................... 280/639; 280/37; 280/651; 280/655
[58] Field of Search ................. 280/639, 37, 651, 655, 280/47.18, 47.37 R, 79.1 R, 79.1 A

[56] References Cited

U.S. PATENT DOCUMENTS

| D. 221,633 | 8/1971 | Kotkowski | D34/23 |
|---|---|---|---|
| 2,563,995 | 8/1951 | East | 280/639 |
| 2,688,493 | 9/1954 | Rosenberg | 280/651 |
| 3,220,773 | 11/1965 | Burns | 280/79.2 |
| 3,985,372 | 10/1976 | Ollsson | 280/655 |

FOREIGN PATENT DOCUMENTS 867582 10/1940 France ................................ 280/651

OTHER PUBLICATIONS

Hand Propelled Vehicles, H. Zerling Mfg. Co., Cincinnati, Ohio, U.S.A.; p. 68, Book #9, 1908.
Radio Steel & Mfg. Co. Cat., p. 2, Model 12, Radio Flyer Rodeo, Nov. '79.

Primary Examiner—Charles A. Marmor
Assistant Examiner—Richard Camby
Attorney, Agent, or Firm—Stetina and Brunda

[57] ABSTRACT

A collapsible transport cart having down-folding side and end panels is disclosed. The side and/or end panels are spring biased in directions so as to assist the user in converting the cart from a collapsed to an operative configuration. A tow bar/handle is attached to the front of the cart so as to be generally pivotal in a vertical plane. Also provided is means whereby the tow bar/handle may be locked in a vertical "ready" position while not in use.

15 Claims, 2 Drawing Sheets

U.S. Patent  Aug. 15, 1989  Sheet 1 of 2  4,856,810
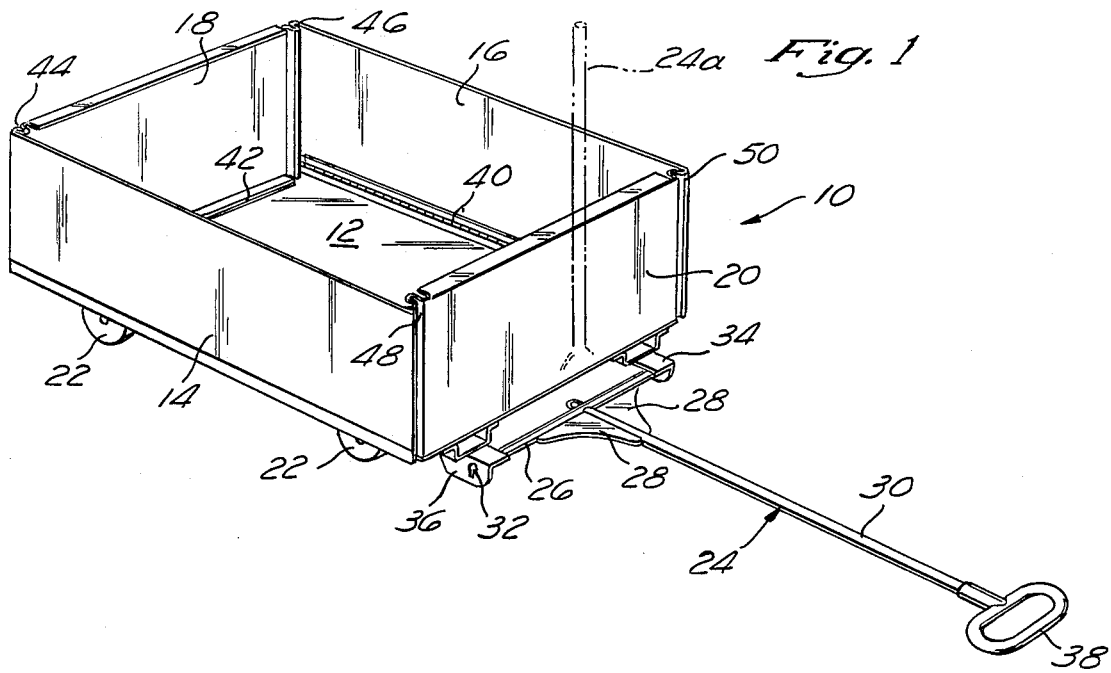
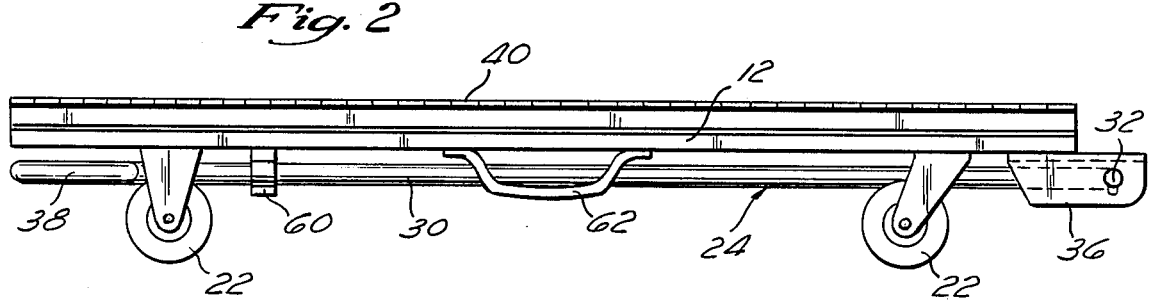
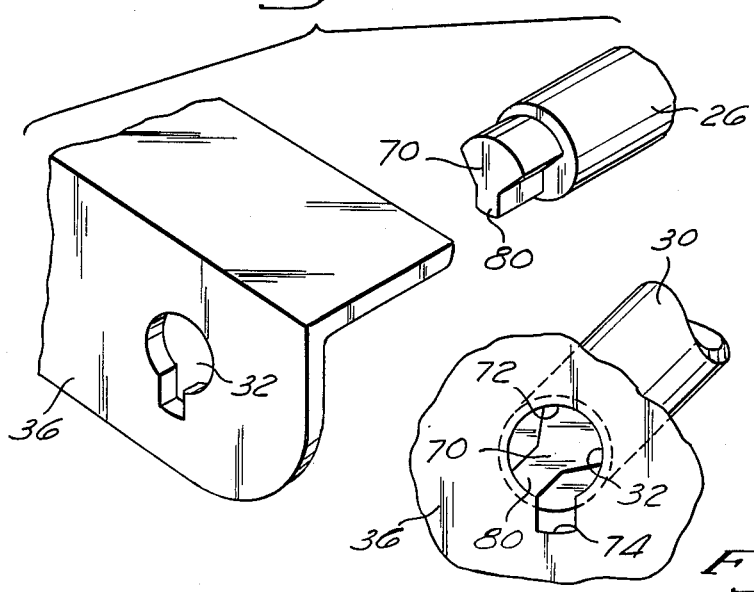
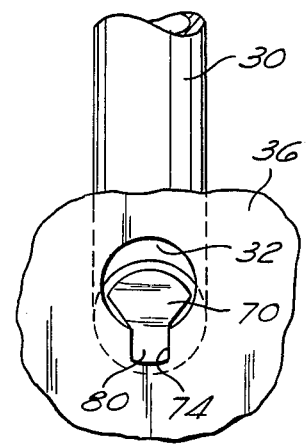

SELF-ACTUATING COLLAPSIBLE TRANSPORT CART

This invention relates generally to the art of materials handling, and more particularly to a collapsible cart for use in moving miscellaneous items of cargo.

BACKGROUND OF THE INVENTION

A variety of cargo transporting means are well-known in the materials handling art. Such cargo transporting means include wheelbarrows, and various other wheeled vehicles which a user may push from behind. In addition, the art is replete with carts and wagons which are designed to be pulled by a user. In general, these hand carts, wheelbarrows, and cargo moving devices are useful in situations where a user wishes to transport small items of cargo over relatively short distances. For example, standard grocery carts are well known and are frequently used by persons who transport bags of groceries short distances from store to home, especially in urban areas. Grocery carts of the type described are generally of segmental wire construction and are routinely specifically sized and configured for the carrying of grocery bags and the like. Such carts may be designed to be collapsible, but few if any are designed to be self-actuating or rapidly converted from a collapsed to operable configuration and vice versa.

Small wheeled transport carts find utility in residential and/or commercial situations where certain items of cargo must be transported from a parked automobile or truck to a home or office some distance away. Such situations often arise in business and condominium or apartment complexes where residents are required to park their automobiles or delivery trucks some distance from the home/office and to transport cargo from the vehicle to the home/office. In order to facilitate the transport of cargo from the vehicle to the home/office, it is desirable to have a versatile, multi-purpose cargo cart which is of lightweight construction, easily collapsible, and which requires minimal storage space within the vehicle. At the same time, however, it is desirable that the cart when disposed in its operational configuration, be capable of transporting substantial amounts and various types of cargo. Accordingly, a substantial need in the art exists for a collapsible, self-actuating transport cart which provides ease in transporting various items of cargo, while being sufficiently lightweight and collapsible to be routinely stored in an automobile trunk or other limited storage space.

SUMMARY OF THE INVENTION

The present invention contemplates a new and improved transport cart having a plurality of side and/or end walls which may be foldably stowed in a collapsed position or may be upwardly disposed in an operative position. The invention overcomes deficiencies of the prior art by providing a collapsible transport means of simple, inexpensive, and lightweight construction and which is constructed of a minimum number of quickly and easily assembled component parts.

Briefly stated, in accordance with one aspect of the invention, there is provided a collapsible transport cart comprising a cargo bed having a floor panel and a multiplicity of side panels pivotally connected about the periphery of the floor panel. The side panels may be down-folded to collapsed positions wherein such side panels are horizontally positioned on the upper surface of the floor panel. In this collapsed position, the transport cart may be easily stowed or alternatively be used as a flat dolly for transport of items. Alternately, the side panels may be positioned vertically, in their operational positions, about the periphery of the floor panel and interlocked with one another to form a continuous side wall enclosure about the outer edges of the floor panel. A plurality of wheels are rotatably connected to the underside of the cargo bed and at least one tow bar having a handle attached thereto is provided for guiding and manipulating the cart during operation.

In accordance with a further aspect of the invention, the floor panel of the collapsable transport cart may be generally rectangular in shape with two side walls and two end walls mounted by hinges along the outer edges of the rectangular floor panel.

In accordance with a still further aspect of the invention, the side and/or end panels may be mounted on spring loaded hinges so as to be selectively biased in either a downward or an upward direction. Such biasing of the side and end panels will have two effects. First, such biasing will serve to hold the side panels—and the underlying end panels—in their folded, collapsed positions until it is desired to actuate the cart by disposing the side and end panels in their alternate operative configuration. When actuation of the cart is desired, the downwardly biased side panels may be manually lifted to their vertical position. Lifting of the side panels will then free the underlying, upwardly biased end panels, allowing them to spring into their vertical, operative configuration in cooperation with the previously lifted side panels.

In accordance with still another aspect of the invention, the tow bar/handle may be attached at one end of the cart such that it extends beyond the cart and provides a means for manipulating the cart on its wheels while being sufficiently pivotal in a vertical plane to enable stowing of the tow bar/handle in a position under the cart. A positioning clip is provided on the underside of the floor panel to hold the tow bar in such stowed position. Thus, when the side walls and end panels are folded in their collapsed configuration and the first handle is stowed under the floor panel, the device of the present invention forms a compact, flat unit.

In accordance with an even further aspect of the invention, a carrying handle may be provided whereby the user may easily carry the collapsed transport cart in a suitcase-like fashion, such carrying handle being sized and positioned so as not to interfere with normal use of the transport cart when it is subsequently disposed in its operative position.

In accordance with yet another aspect of the invention, the tow bar/handle may be connected to the transport cart in a manner which permits a generally free range of motion in operation, yet be disposed in an upright "ready" position when desired. To achieve this aspect of the invention, the tow bar/handle is provided at its proximal end with a base cross-member having terminal irregularly-shaped lugs at opposite ends thereof. The irregularly-shaped lugs of the cross-member are sized and configured to fit into corresponding mating keyways which extend through angular mounting brackets connected to the underside of the floor panel. Such angular mounting brackets extend beyond the front edge of the transport cart. Positioning of the lugs in the top portion of the corresponding keyways enables the operator of the cart to freely manipulate the tow bar/handle in an up-down rotational manner and further enables free rotation of the tow bar/handle to a stowed position directly beneath the floor panel of the cart. Such arrangement further provides a point on the range of motion of the tow bar/handle whereat the lugs will drop into a lower portion of the corresponding keyways, thereby locking the tow bar in a "ready" position. This keyway lock may then be disengaged by upwardly lifting the tow bar in a vertical direction. Unlocking of the lug-keyway arrangement renders the tow bar once again freely movable in upward and downward directions.

The principal object of the invention is to provide a collapsible, self-actuating transport cart which is of simple and easily fabricated construction having a minimum number of component parts and capable of providing the user with an easily storable and functional means for transporting items of cargo.

Still another object of the invention is to provide a transport cart of the foregoing character which is easily convertible from a first collapsed configuration to a second operative configuration with only a minimal amount of handling.

A further object of the invention is to provide a transport cart of the foregoing character which, when folded into its first collapsed configuration, is sufficiently flat to be easily stored within the trunk of a motor vehicle and which, when so stored, will permit various items of cargo to also be carried therewith within the cargo space of the vehicle.

A still further object of the invention is to provide a transport cart of the foregoing character having a front tow bar/handle which is positionable in an easily accessible "ready" position when the transport cart is not in use, and which may further be positionable in a "stowed" position underneath the cargo bed floor panel of the collapsible cart.

Still further objects and advantages of the invention will be apparent from the following detailed description of a preferred species thereof, and from the accompanying drawings.

BRIEF DESCRIPTION OF THE DRAWINGS

FIG. 1 is a perspective view of the self-actuated, collapsible transport cart of the present invention disposed in an operative configuration;

FIG. 2 is a side elevational view of the collapsible, self-actuating transport cart of the present invention disposed in a collapsed configuration;

FIG. 3 is an exploded cut-away view showing the relationship of the terminal irregularly-shaped lug of the tow bar/handle cross-member to the corresponding keyway aperture which extends through the tow bar mounting member;

FIG. 4 is a cut-away view showing the keyway mounting of the tow bar/handle of the present invention while such tow bar/handle is in its freely movable position;

FIG. 5 is a cut-away view showing the keyway mounting of the tow bar/handle of the present invention while such tow bar/handle is dispensed in its "ready" position;

DETAILED DESCRIPTION OF A PREFERRED EMBODIMENT

Figure 6:
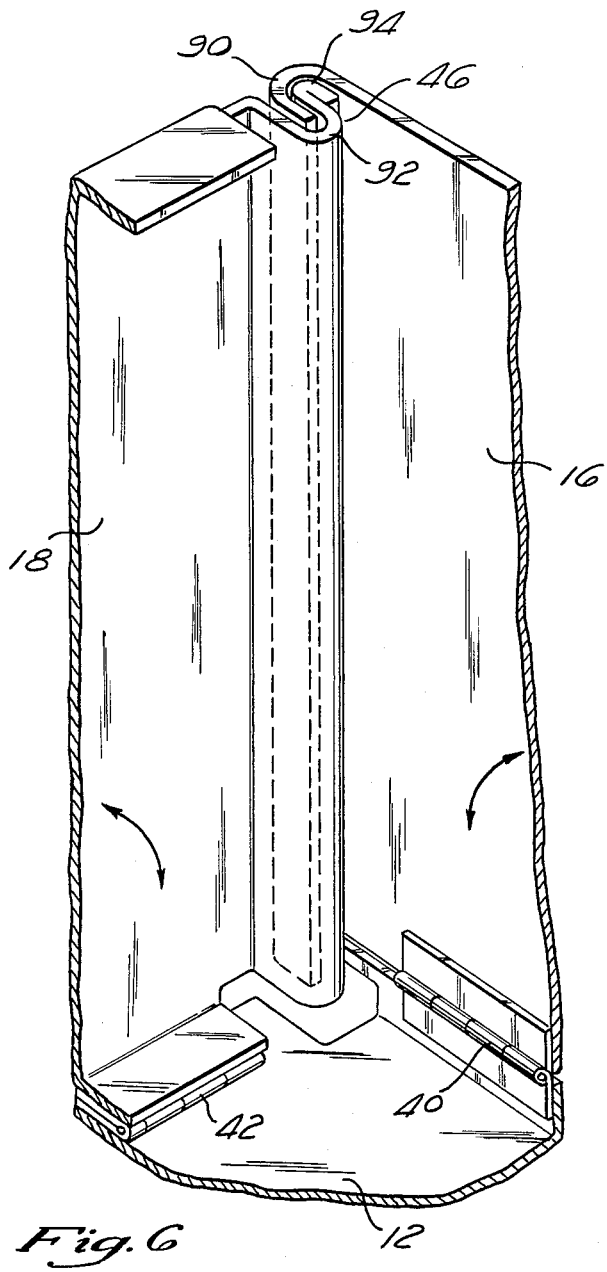
FIG. 6 is a cut-away perspective view of a corner of the transport cart.

Referring now to the drawings wherein the showing is made for the purpose of describing a preferred embodiment of the invention and not for purposes of limiting the same, FIG. 1 depicts the collapsible transport cart 10 of the present invention. Transport cart 10 comprises a floor panel 12, side panels 14 and 16, and end panels 18 and 20. Wheels 22 are positioned beneath floor panel 12 so as to rotatably contact any surface which underlies the cart.

A tow bar/handle 24 extends from one end of the cart. The tow bar is formed having a generally T-shaped configuration composed of a longitudinal member 30 and a cross-member 26 attached at the proximal end thereof. Angular support webs 28 extend between the longitudinal member 30 and cross-member 26.

Cross-member 26 is provided at either end with irregularly-shaped lugs which are insertable in correspondingly-sized keyway apertures 32. Keyway apertures 32 extend fully through angular tow bar attachment brackets 34 and 36.

A handle portion 38 is formed at the opposite end of the tow bar/handle 24. Tow bar/handle 24 is generally freely movable and may be pivoted in an upward-downward rotational manner. Additionally, the tow bar/handle 24 may be locked in an upward "ready" position as shown by dotted lines 24a. Positioning of handle 24 in "ready" position 24a is facilitated by specific locking of the cross-member 26 within keyway apertures 32. Thereafter, when it is desired to manipulate handle 24 in a downward position so as to enable pushing or pulling of the cart, the tow bar/handle 24a may be raised or lifted in a vertical direction to disengage the locking mechanism and to once again enable free movement of the tow bar/handle.

Side panels 14 and 16 are pivotally connected to the side edges of the floor panel 12 by hinges 40. End panels 18 and 20 are likewise pivotally connected to the ends of floor panel 12 by hinges 42.

For optimal ease of handling, the end wall hinges 42 are upwardly spring biased while the side wall hinges 40 are either non-biased or downwardly spring biased. If biased, the downward biasing tension on side wall hinges 40 is sufficient to hold the side walls down over the under-folded end panels 18 and 20 when the cart 10 is in its fully collapsed position. Furthermore, the upward biasing of the end panel hinges 42 is sufficient to cause the end panels to spring up after the over-lying side panels 14 and 16 have been manually lifted to their vertically disposed, operative positions. As end panels 18 and 20 spring up in such a manner, the lateral edges of end panels 18 and 20 and the lateral edges of side panels 14 and 16 will interact to form generally right angular corners 44, 46, 48, and 50.

The fully collapsed configuration of the transport cart may be appreciated from FIG. 2. As shown, the end and side panels are down-folded and horizontally juxtapositioned on the upper surface of the floor panel 12. Side panel hinge 40 is seen to be exposed along the entire length of the down-folded side panel.

Additionally, the tow bar/handle 24 has been pivoted fully beneath the floor panel 12 such that the tow bar 24 is fully positioned under the floor panel 12 and linear member 30 of tow bar/handle 24 is held in place by clip 60.

Additionally, a carrying handle 62 is attached at the outer edge of the underside of floor panel 12 to enable the user of the cart to hand carry the cart while it is in its collapsed configuration.

The specific, preferred means of connecting the tow bar to the transport cart is shown in detail by the cutaway representation of FIG. 3. FIG. 3 shows an angular tow bar attachment bracket 36 with keyway aperture 32 extending therethrough. Also shown is one end of cross-member 26 having an irregularly-shaped aperture 60 extending outwardly therefrom. The key-shaped aperture 60 is specifically sized and configured to remain fully rotatable when positioned within the upper circular portion of keyway aperture 32 as shown in FIG. 4.

Specifically, FIG. 4 shows a cutaway section of mounting member 36 having keyway aperture 32 extending therethrough with irregularly-shaped lug 70 inserted therewithin. The entire body of the irregularly-shaped lug 70 is positioned within the circular top portion 72 of keyway aperture 32. Thus, the lower rectangular portion 74 of keyway aperture 32 remains open and, by such arrangement, the irregularly-shaped lug 70 remains fully rotatable within the upper circular portion 72 of keyway aperture 32. Such free rotation allows the longitudinal portion 30 of tow bar 24 to be pivotably manipulated in a vertical plane.

FIG. 5 shows a similar cutaway view of handle mounting member 36 wherein tow bar/handle 24 is disposed in its vertical "ready" position and is held in such position by insertion of the rectangular bottom portion 80 of irregularly-shaped lug 70 within the corresponding rectangular lower portion 74 of keyway aperture 32. By such arrangement, the longitudinal member 30 of tow bar 24 is held in an upright position and will remain in such position without human assistance, until such time as the tow bar is lifted directly upward. Upward movement of the tow bar 24 will disengage the bottom portion 80 of irregular lug 70 from placement within the corresponding rectangular bottom portion 74 of keyway 32.

The interlocking of the side and rear panels, when disposed in their upright operative position, is achieved by a novel and inventive corner structure which permits actuation of the device with minimal handling. Such novel corner structure is shown in FIG. 6 wherein a right angle corner 46 is generally formed by the convergence of side panel 16 and rear panel 18. As shown, the rear edge of side panel 16 is bent to form a U-shaped configuration 90 while the side edge of rear panel 18 is correspondingly provided with an inwardly disposed U-shaped configuration 92. U-shaped configuration 92 of rear panel 18 is further provided with a convoluted, double thickness tip 94 which is sized to fit snugly within the inner recess of the U-shaped configuration 90 of side panel 16. Accordingly, when side panel 16 is lifted against the urging of downwardly biased hinge 40 to its full upright operative position, end panel 18 will spring to its full upright operative position by operation of upwardly biased spring hinge 42. As end panel 18 assumes its full upright position, the U-shaped configuration 92 of end panel 18 will self-engage the corresponding U-shaped configuration 90 at the rear extent of side panel 16. Convoluted portion 94 of the U-shaped configuration 92 of end panel 18 will firmly insert within the U-shaped configuration 90 of side panel 16, thereby forming a firm interlocked connection between end panel 18 and side panel 16.

Figure 7:
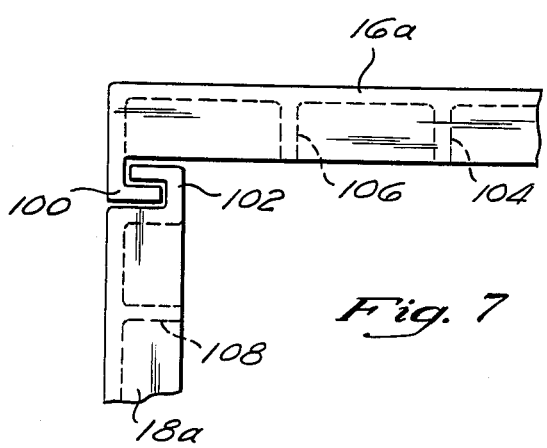
FIG. 7 is a plan view of a corner of the transport cart wherein the side and end walls are formed of ribbed, molded plastic.

It is anticipated that the transport cart of the present invention may be made of many different materials, including lightweight molded plastic. FIG. 7 shows an alternative embodiment of the corner 46 of the device wherein side panel 16a is provided with a hook-like engagement means 100 extending inwardly while end panel 18a is provided with a corresponding hook-like engagement means 102 extending outwardly. Thus, as with the alternative embodiment shown in FIG. 6, the molded plastic side panel 16a and molded plastic end panel 18a will cooperate to engage one another and to form a generally solid right angle corner therebetween. The molded plastic construction shown in FIG. 7 is characterized by thin walls with reinforcing ribs 104, 106, and 108 to accomplish a favorable strength to weight ratio.

Operation of the Preferred Embodiment

Referring again to FIG. 1 wherein the self-actuating collapsible transport cart is shown in its operative configuration, it should be appreciated that manual positioning of side panels 14 and 16 in their vertical upright positions, against the urging of downwardly biased spring members 40, will permit end panels 18 and 20 to spring up into their corresponding full upright vertical position in response to the urging of spring-loaded hinges 42. As end panels 18 and 20 spring upward into their vertical positions, the above-described U-shaped engagement means at each corner thereof will engage one another to form corners 44, 46, 48, and 50.

Tow bar 24 may then be used to manipulate the cart over the ground or underlying surface as it rolls on wheels 22. When not being manipulated by the user, the tow bar 24 may be placed in its upright "ready" position 24a by upwardly pivoting the bar to a position generally perpendicular to the floor panel 12 of the transport cart. When in such position, the above-described irregular lugs of cross-member 26 will lock in corresponding keyways 32 thereby holding the tow bar 24 in its upright "ready" position 24a until such time as movement of the transport cart is again desired. When such movement is desired, the "ready" positioned tow bar 24a can simply be lifted in an upward position to disengage the lug from the corresponding rectangular bottom portion of keyway 32 thereby permitting downward pivotal manipulation of the tow bar 24 to a position that is convenient for the user.

After using the self-actuating collapsible transport cart to move the desired cargo, the cart may be unloaded and again folded into its collapsed configuration as shown in FIG. 2. The transport cart may be transformed to its collapsed configuration by manually pressing end panels 18 and 20 downward against the urging of upwardly biased spring hinges 42 until end panels 18 and 20 are horizontally juxtapositioned against the upper surface of floor panel 12. The side panels 14 and 16 will then automatically down-fold over the top of horizontally positioned end panels 18 and 20. If the side panels are downwardly biased by their associated hinges, the tension on downwardly biased hinges 40 is sufficient to hold the ends 18, 20 and sides 14, 16 panels of the device in their down-folded collapsed position whereby the cart will then remain in its collapsed configuration forming a flat unit structure. Alternatively, if the side panels are not downwardly biased, a clasp (not shown) may be utilized across the outer surfaces of the side panels to maintain this stowed configuration.

The collapsed transport cart may then be tipped on its side and tow bar 30 may be pivotally swung under the bottom of floor panel 12 and positioned within clip 60 thereby stowing the entire tow bar 24 on the underside of the collapsed cart. The fully collapsed transport cart may then be hand carried by carry handle 62. Alternatively, the collapsed transport cart may be used as a flat dolly for transport of items in a conventional manner.

Although the present invention has been described with reference to preferred embodiments thereof, it is to be appreciated that modifications and alterations will likely occur to others upon reading and understanding of the specification. In this regard, it will be recognized that the particular self-locking corner configurations of the side and end panels may be utilized in analogous arts such as in luggage applications, wherein a collapsible/operable luggage configuration is obtained. Accordingly, it is intended that all such modifications and alterations be included insofar as they come within the scope of the appended claims or the equivalents thereof.

What is claimed is;

1. A collapsible transport cart comprising:

a horizontal floor panel;

at least one wheel rotatably mounted beneath said floor panel;

at least one side panel pivotally attached to said floor panel;

at least one end panel pivotally attached to said floor panel;

said side panel(s) and said end panel(s) being alternatively positionable in a first collapsed configuration, wherein said end panel(s) and said side panel(s) are foldably disposed adjacent a surface of said floor panel, and a second operative configuration wherein said end panels and said side panels are disposed generally normal to said horizontal floor panel thereby forming a cargo bed having at least one side wall and at least one end wall; and means cooperating with said end panel(s) and said side panel to selectively bias said end panel and said side panels in upward and downward directions, such that the downward biasing of selected panels will function to hold at least one of said panels in said first collapsed configuration and the upward biasing of said selected panel(s) will function to assist in converting the disposition of at least one of said panels from said first collapsed configuration to said second operative configuration.

2. The collapsible transport cart of claim 1 wherein said end panels are upwardly biased.

3. The collapsible transport cart of claim 1 wherein said side panels are downwardly biased.

4. The collapsible transport cart of claim 1 further comprising:

a tow bar attached proximally to said cart and extending distally beyond said cargo bed, thereby providing a means whereby said cart may be movably manipulated on an underlying surface;

means for connecting said tow bar to said cart such that a substantially free range of upward and downward motion of said to bar is permitted while additionally providing for releasable locking of said tow bar in a single position generally perpendicular to said horizontal floor panels;

said means for connecting said tow bar to said transport cart comprising at least one irregularly shaped lug member extending from an end of said proximal cross-member, said irregularly shaped lug member being inserted within at least one corresponding keyway aperture positioned on said transport cart, said lug member and said keyway aperture(s) being correspondingly sized and configured to permit free rotation of said lug member(s) within a first region of said keyway aperture(s) while further providing for non-rotational locking of said lug member(s) within a second region of said keyway aperture(s).

5. The collapsible transport cart of claim 1 wherein said upward and downward biasing of said side and end panels is accomplished by the provision of spring loaded hinges whereby said panels are pivotally attached to said floor panel.

6. A collapsible transport cart comprising:

a floor;

a plurality of walls pivotally attached to said floor to be alternately disposable in a first collapsed position wherein said walls are generally parallel to said floor and a second operative position wherein said walls are generally perpendicular to said floor;

means cooperating with said walls for biasing at least one of said walls in said first collapsed position and at least one of said walls in said second operative position;

at least one wheel rotatably connected to said transport cart; and a tow bar connected to said transport cart.

7. The transport cart of claim 6 wherein said tow bar extends outwardly from an end of said cart and is generally freely pivotal in a vertical plane relative to said floor.

8. The transport cart of claim 7 wherein said tow bar is further positionable beneath said floor.

9. The transport cart of claim 7 wherein a first locking means is provided for locking said tow bar in an upright position generally perpendicular to said floor.

10. The transport cart of claim 7 wherein a second locking means is provided for locking said tow bar in said stowed position under said floor.

11. The transport cart of claim 6 wherein said biasing means comprises spring loaded hinges whereby said panels are attached to said floor.

12. The transport cart of claim 6 wherein said floor is generally rectangular in shape and said walls comprise two side walls and two end walls pivotally mounted about the periphery of said rectangular floor.

13. The collapsible transport cart of claim 6 wherein said walls are provided with interlockable edges whereby said walls may be locked in said operative configuration.

14. The transport cart of claim 13 wherein said interlockable edges of said walls comprise corresponding U-shaped bends provided at the outer edges of said walls, said U-shaped bends being positioned to cooperatively engage one another when said walls are disposed in said operative configuration, thereby forming generally solid corners therebetween.

15. The transport cart of claim 13 wherein said means for interlocking said walls comprise generally hook-like engagement means extending outwardly from said panels, said engagement means cooperatively engaging one another when said panels are positioned in said operative configuration, thereby forming generally solid corners therebetween.

* * * * *